(12) United States Patent
Lane

(10) Patent No.: US 7,487,743 B1
(45) Date of Patent: Feb. 10, 2009

(54) CAT LITTER BOX APPARATUS

(76) Inventor: Magnus Lane, 14 School St., Apt. #11, Vinalhaven, ME (US) 04863

( * ) Notice: Subject to any disclaimer, the term of this patent is extended or adjusted under 35 U.S.C. 154(b) by 160 days.

(21) Appl. No.: 11/467,351

(22) Filed: Aug. 25, 2006

(51) Int. Cl.
*A01K 19/00* (2006.01)

(52) U.S. Cl. .................. 119/166; 119/161; 119/165; D30/161; 209/373

(58) Field of Classification Search ............ 119/416, 119/161, 165, 166, 168, 417, 452, 458, 479, 119/482; D30/161, 162; 209/373
See application file for complete search history.

(56) References Cited

U.S. PATENT DOCUMENTS

| | | | |
|---|---|---|---|
| 4,096,827 A | 6/1978 | Cotter | |
| 5,531,186 A | 7/1996 | Flood et al. | |
| 5,678,508 A * | 10/1997 | Butzen | 119/166 |
| 5,749,318 A | 5/1998 | Barbot et al. | |
| 5,855,186 A * | 1/1999 | Larsen et al. | 119/116 |
| 6,295,949 B1 * | 10/2001 | Willis | 119/165 |
| 6,494,165 B2 * | 12/2002 | Asbury | 119/166 |
| 2005/0126504 A1 * | 6/2005 | Strickland et al. | 119/166 |
| 2005/0284391 A1 * | 12/2005 | Parr | 119/166 |

* cited by examiner

*Primary Examiner*—Peter M. Poon
*Assistant Examiner*—Kristen C Hayes

(57) ABSTRACT

A cat litter box apparatus for accommodating a plurality of cats, the apparatus controlling odors by providing a lid and two doors which return to a closed position automatically. The apparatus further provides either manual screening of litter via the sieved half-round ended scoop, or semi automatic litter screening via temporary placement of the scoop within either end of the box. The box is selectively tilted and supported in a chosen tilted position. The box further comprises wheels and an omnidirectional caster.

20 Claims, 6 Drawing Sheets

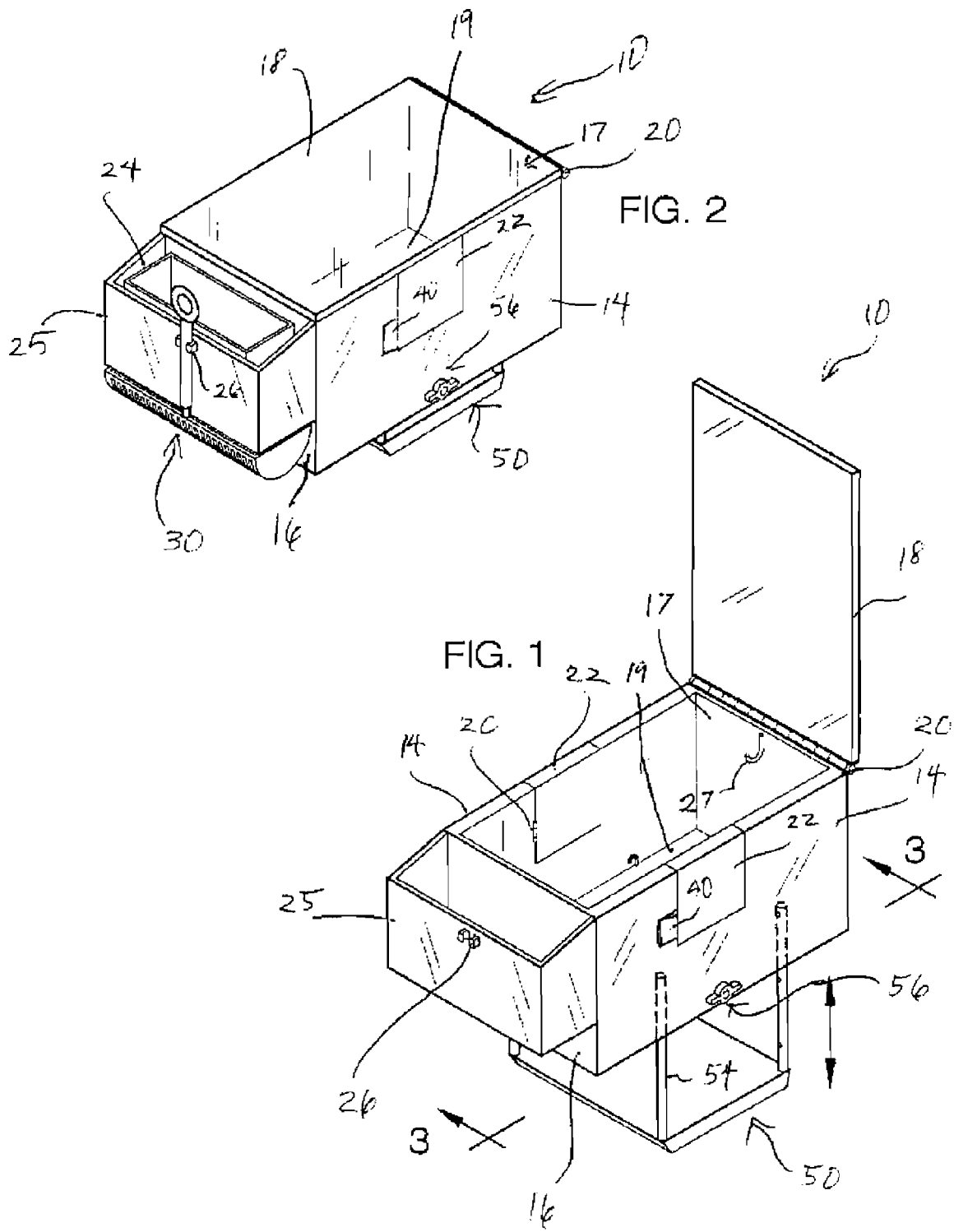

CAT LITTER BOX APPARATUS

BACKGROUND OF THE INVENTION

With cat litter box apparatuses being well known in the art, a plethora of designs and variation exists. Litter boxes typically use a dry granular litter mix, whether a sand mix, a commercially available mix, or any derivation thereof. Various box designs house the litter, which must either be disposed of or screened. Screening removes clumps and fecal matter such that litter can be used and reused. Some boxes offer self-cleaning capabilities. Still others provide for liquid accumulation. What is needed is a litter box which accommodates multiple uses by more than one cat, a portable litter box which provides easy litter screening as well as indicators of the number of times used. Further, a litter box with a lid and animal access doors is desirable, as litter boxes exude unpleasant odors.

FIELD OF THE INVENTION

The cat litter box apparatus relates to cat litter box apparatuses and more especially to a cat litter box apparatus which is covered and has self-closing doors for animal entry, along with a supported tilt for semi automatic litter screening.

DESCRIPTION OF THE PRIOR ART

Prior related art U.S. Pat. No. 5,531,186 issued to Flood et al. on Jul. 2, 1996 teaches a litter box with excrement removing screen. The device is open topped with a slot for sliding the grid tray out of the box's granular material. The grid tray is also lifted from the box, unlike the present apparatus. U.S. Pat. No. 4,096,827 issued to Cotter on Jun. 27, 1978 teaches a self-cleaning cat waste disposal device. The device focuses on portability by offering a substantially suitcase design, unlike the box design of the present apparatus. U.S. Pat. No. 5,749,318 issued to Barbot et al. on May 12, 1998 teaches a self-cleaning litter box, consisting of far more complexity and a different design from the present apparatus. None of the devices provides the numerous combined advantages of the present basic apparatus, which include but are not limited to a size to accommodate numerous cat uses, entrance doors, a hinged transparent lid, a tilting adjustable height support, and use counters.

While the above-described devices fulfill their respective and particular objects and requirements, they do not describe a cat litter box apparatus that provides for the advantages of the present cat litter box apparatus. In this respect, the present cat litter box apparatus substantially departs from the conventional concepts and designs of the prior art. Therefore, a need exists for an improved cat litter box apparatus.

SUMMARY OF THE INVENTION

The general purpose of the cat litter box apparatus, described subsequently in greater detail, is to provide a cat litter box apparatus which has many novel features that result in an improved cat litter box apparatus which is not anticipated, rendered obvious, suggested, or even implied by prior art, either alone or in combination thereof.

To attain this, the cat litter box apparatus provides a size for use in accommodating a plurality of cats. Further, the transparent lid not only provides visible indication of litter screening needs, but also odor control. The side entrance doors provide further for odor control. Doors can be opened in various ways via varied embodiments. One embodiment provides sliding doors, as example. A further embodiment provides hinged doors. The apparatus can be operated in a fully manual way, or in a semi automated fashion. Manually, a user screens the litter chosen to fill the box by hand, then deposits the excrement into the removable tray, for emptying.

In using the apparatus semi automatically, the scoop is hooked on either end of the interior of the box. The box is then tilted toward the end opposite the scoop. The box can be shaken to further aid in litter end-to-end transfer. The closeable doors prevent litter from escaping from the sides of the box. As the litter shifts toward one end, the sieved half-round of the scoop automatically screens the litter for excrement. The scoop is then emptied into the tray. Tilting scoop use can be accomplished via either end of the box. The optional counters on each door provide viewed counting of the number of times the apparatus is used. An operator can either view nees is available in a variety of colors, with the various exterior ded litter screening via the transparent lid, or screen or change litter by noting the number of uses of the box, deciding themselves on how many uses indicates a need for litter screening or replacement.

The wheels and casters of the apparatus provide for mobility as needed. The support provides a further aid in either allowing mobility or impeding it. The apparatus can be made of any suitable metal, plastic, polymer or other chosen material. And, any chosen side, end, lid, or bottom can be transparent.

The apparatus surfaces are ideal for logo placements. The apparatus provides superior hygiene, non-human contact, convenience, practicality, durability, and ease of use. The one-pass screening of litter affords quick operation. The basic design negates unnecessary complexity.

Thus has been broadly outlined the more important features of the improved cat litter box apparatus so that the detailed description thereof that follows may be better understood and in order that the present contribution to the art may be better appreciated.

An object of the cat litter box apparatus is to operable either manually or semi automatically.

Another object of the cat litter box apparatus is to provide for multiple cat users.

A further object of the cat litter box apparatus is to provide mobility.

An added object of the cat litter box apparatus is to provide odor control.

And, an object of the cat litter box apparatus is to provide more than one indicator for litter change or screening.

Further, an object of the cat litter box apparatus is to be basic in design and production.

These together with additional objects, features and advantages of the improved cat litter box apparatus will be readily apparent to those of ordinary skill in the art upon reading the following detailed description of presently preferred, but nonetheless illustrative, embodiments of the improved cat litter box apparatus when taken in conjunction with the accompanying drawings.

In this respect, before explaining the current embodiments of the improved cat litter box apparatus in detail, it is to be understood that the cat litter box apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved cat litter box apparatus. It is therefore important that the claims be regarded as including such equivalent constructions insofar as they do not depart from the spirit and scope of the cat litter box apparatus. It is also to be understood that the phraseology and terminology employed herein are for purposes of description and should not be regarded as limiting.

BRIEF DESCRIPTION OF THE DRAWINGS

FIG. 1 is a perspective view of the apparatus with support in a downwardly extended position, box lid open.

FIG. 2 is a perspective view of the apparatus with support in retracted position, box lid closed, scoop hooked on scoop hook, and excrement tray in place within tray keeper.

DETAILED DESCRIPTION OF THE DRAWINGS

Figure 3:
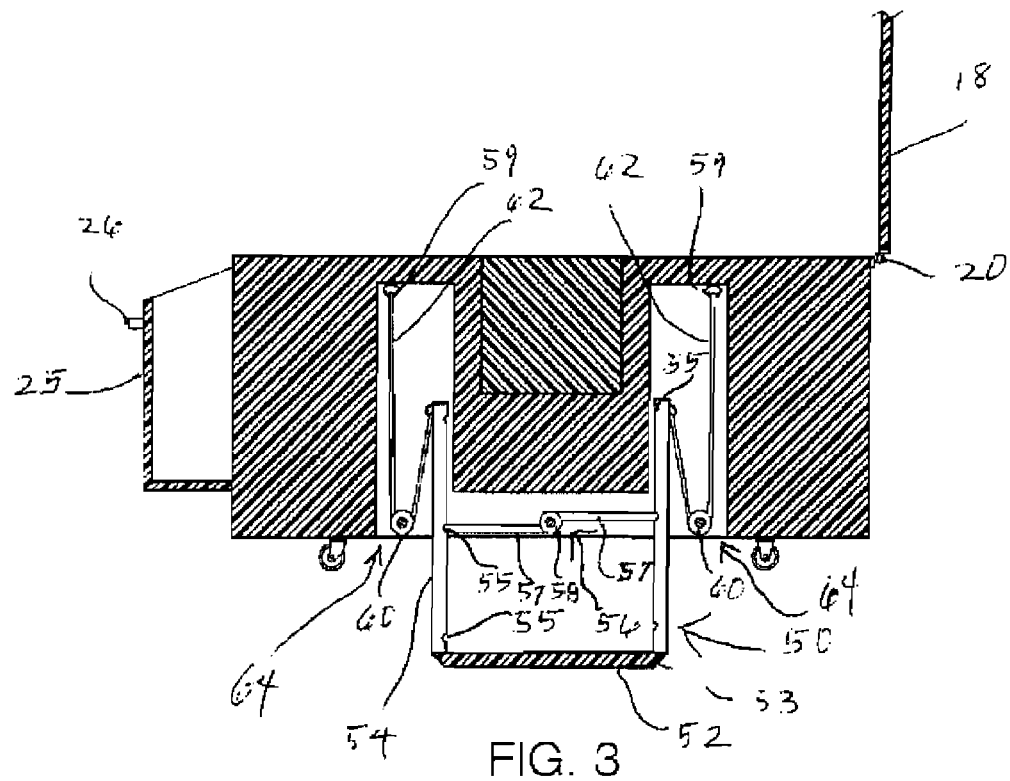
FIG. 3 is cross sectional view of FIG. 1, taken along the line 3-3.

With reference now to the drawings, and in particular FIGS. 1 through 7 thereof, the principles and concepts of the cat litter box apparatus generally designated by the reference number 10 will be described.

Referring to FIGS. 1 and 2, the apparatus 10 comprises a parallelepiped box 12 having two opposed sides 14, a first end 16, a second end 17, and a bottom 19. The transparent lid 18 for the box 12 provides an aid in viewing litter 100 and excrement 110 as further guide for a user in determining when to service the apparatus 10. The lid 18 opens pivotally about the hinge 20. An entrance door 22 is disposed on each side 14 of the box 12. Each entrance door 22 is incorporates a hinge 20 for opening inwardly and outwardly from each side 14. The spring loaded door hinge 20 provides for each door 22 to open inwardly and outwardly, and return to a closed position automatically. A counter 40 is optionally provided on each door 22. Door 22 openings are thereby counted and displayed in helping to determine further when to service the apparatus 10.

A pair of spaced apart wheels 36 is disposed on the box 12 bottom 19. The wheels 36 are disposed proximal to the second end 17 of the bottom 19. The omnidirectional caster 38 is disposed on the box 12 bottom 19. The caster 38 is proximal to the first end 16 of the box 12. The removable scoop 30 is located at the user's discretion. An interior hook 27 is located within the first end 16 of the box 12. An additional interior hook 27 is located within the second end 17 of the box 12. Further, a scoop hook 26 is disposed on an exterior of the tray keeper 25.

The tray keeper 25 is affixed to the first end 16 of the box 12. The removable excrement tray 24 is removably held within the tray keeper 25. Both of the interior hooks 27 and the scoop hook 26 removably hold the scoop 30 by user choice. The scoop 30 width is slightly less than the interior width of the box 12. The telescopic handle 32 provides for the scoop 30 to be positioned as desired, either in use within the box 12 or by hand. The support 50 extends and retracts below the box 12 bottom 19.

Figure 4:
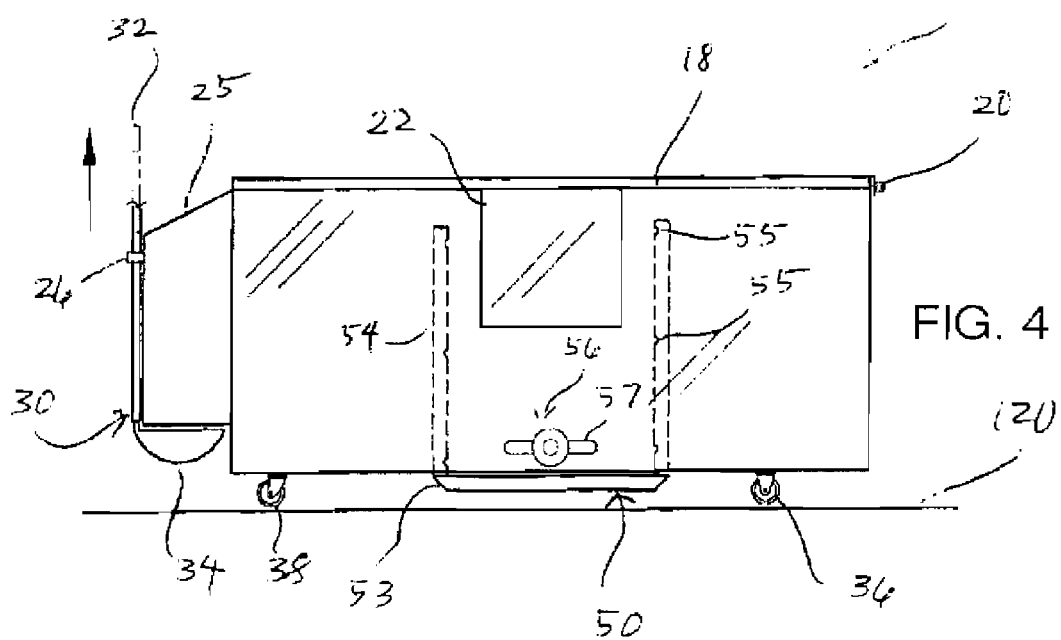
FIG. 4 is a side elevation view of the apparatus.

Referring to FIGS. 3 and 4, a compartment 64 is disposed within each box 12 side 14. The box support 50 selectively extends below the box 12 bottom 19. The support 50 is comprised of the support base 52 and support legs 54. Two pair of spaced apart support legs 54 are affixed to the support base 52. Each pair of support legs 54 is affixed to an opposite side of the support base 52. Each pair of support legs 54 is movably contained within one of the side 14 compartments 64. The support base 50 has a leading edge and a trailing edge. An angled edge 53 comprises both the leading base 52 edge and on the trailing base 52 edge. A plurality of spaced apart leg notches 55 is disposed in each leg 54.

The leg notches 55 are preferably equidistantly spaced apart. The support latch 56 is affixed to one side 14 of the box 12. The latch 56 comprises a spring-loaded latch pivot 58. A support rod 57 extends laterally from each side of the pivot 58. Each support rod 57 is for retractable insertion into one of the leg notches 55. A spaced apart pair of anchors 59 is disposed within a top of each compartment 64. A pair of spaced apart pulleys 60 is disposed within a bottom of each compartment 64. An elastic cord 62 is provided for each leg 54. Each cord 62 is affixed to an anchor 59. Each cord 62 is disposed partially around each pulley 60. Each cord 62 is affixed to a top of a leg 54. A user pulls or pushes the support base 52 while rotating the support latch pivot 58. Rotating the latch pivot 58 against the latch pivot spring (not shown) resistance releases the rods 57 from the leg 54 notches 55, thereby allowing the support 50 to be positioned as desired. The elastic cord 62 biases the support base 52 to return to a position proximal to the box 12 bottom 19. The first extended position of the support 50 provides for drag against a chosen floor 120 so that the apparatus 10 is not likely to roll on the wheels 36 and caster 38. Elevating the support 50 allows easy rolling of the apparatus 10.

Figure 5A:
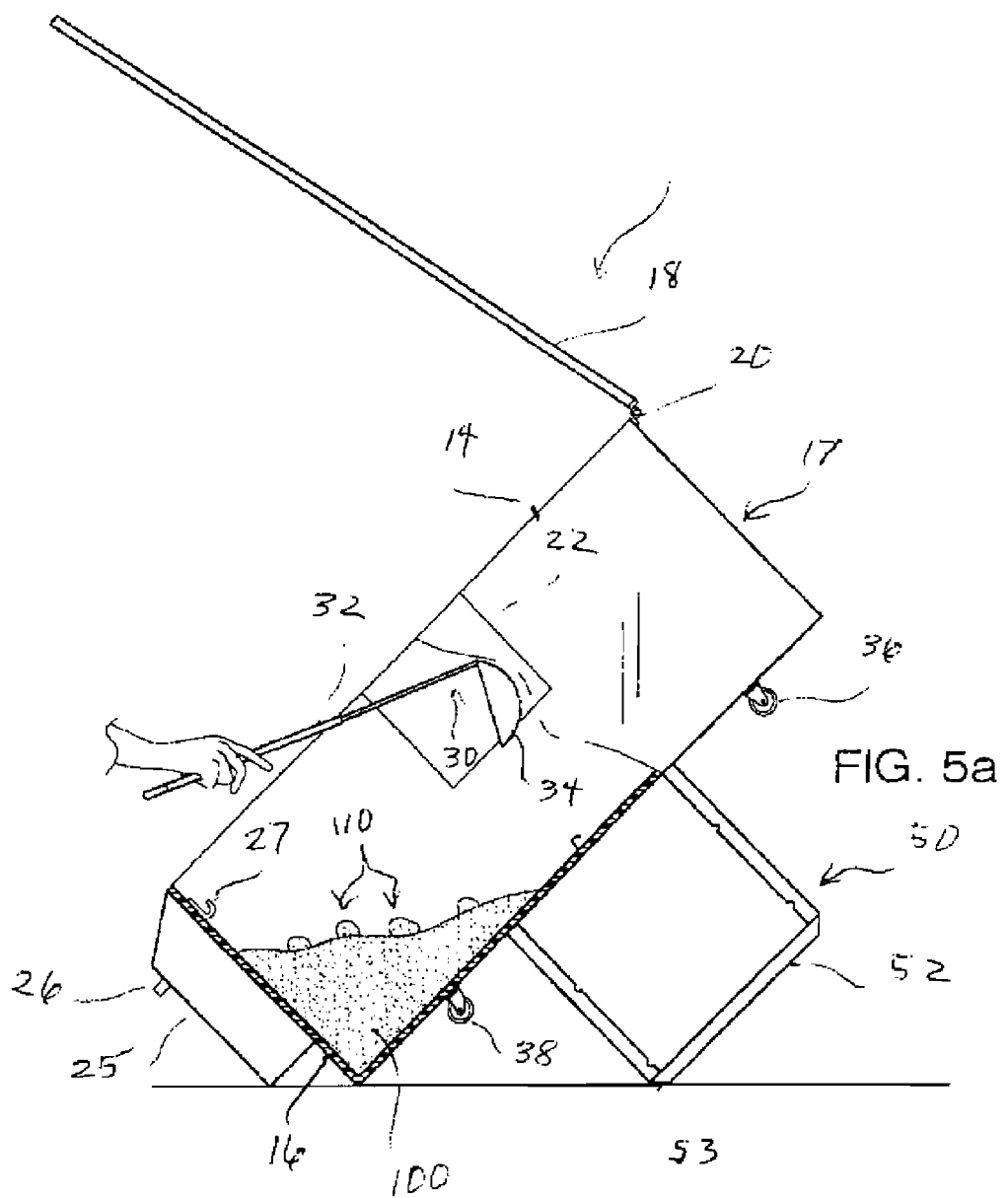
FIG. 5a is a side elevation view of the apparatus tilted on the support, first end down, scoop being hand used.

Referring to FIG. 5a, the support 50 is extended to its greatest capability. The angled edge 53 provides for proper support of the apparatus 10 in the tilted position. The apparatus 10 is selectively tilted toward the first end 16. The scoop 30 telescoping handle 32 is extended. The scoop 30 is in use in gathering excrement 110 from the litter 100.

Figure 5B:
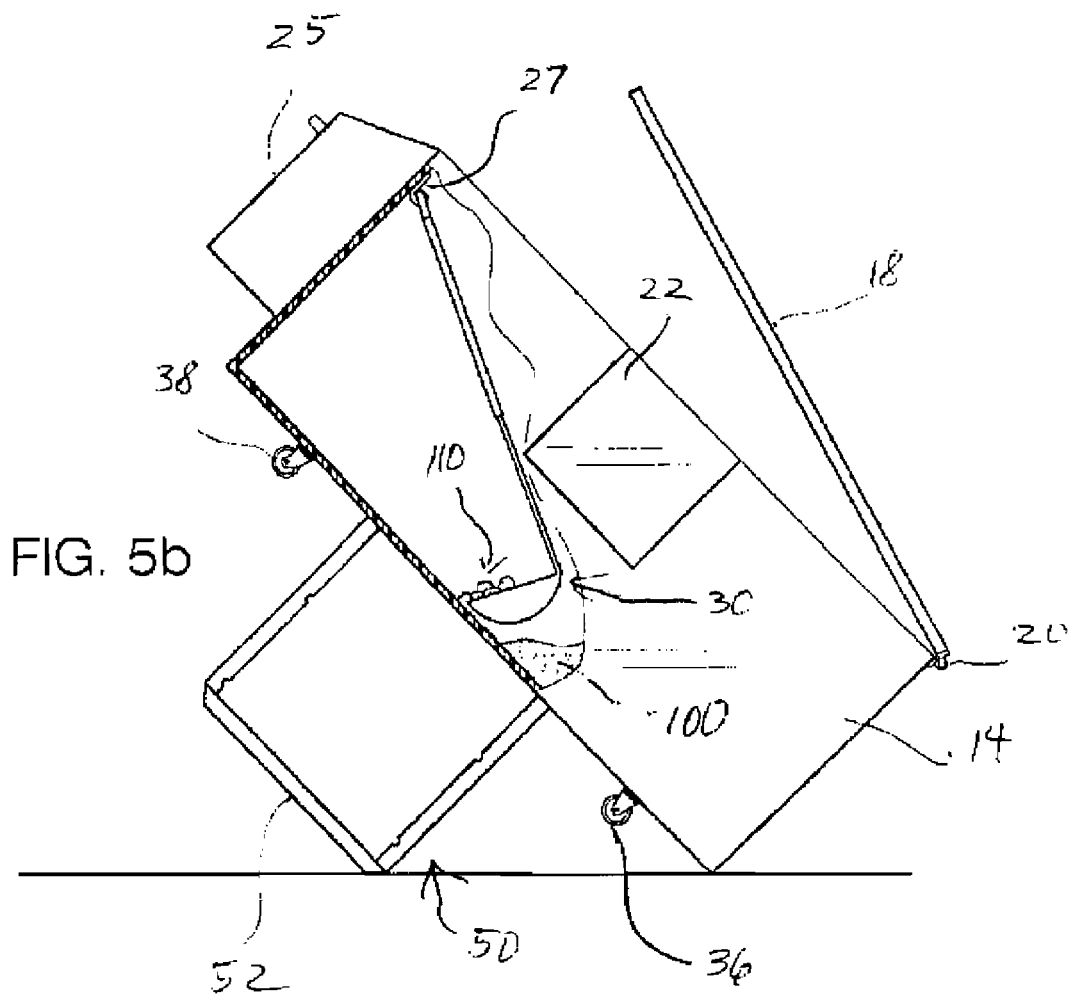
FIG. 5b is a side elevation view of the apparatus tilted on the support, second end down, scoop in the interiorly auto use position.
Figure 5C:
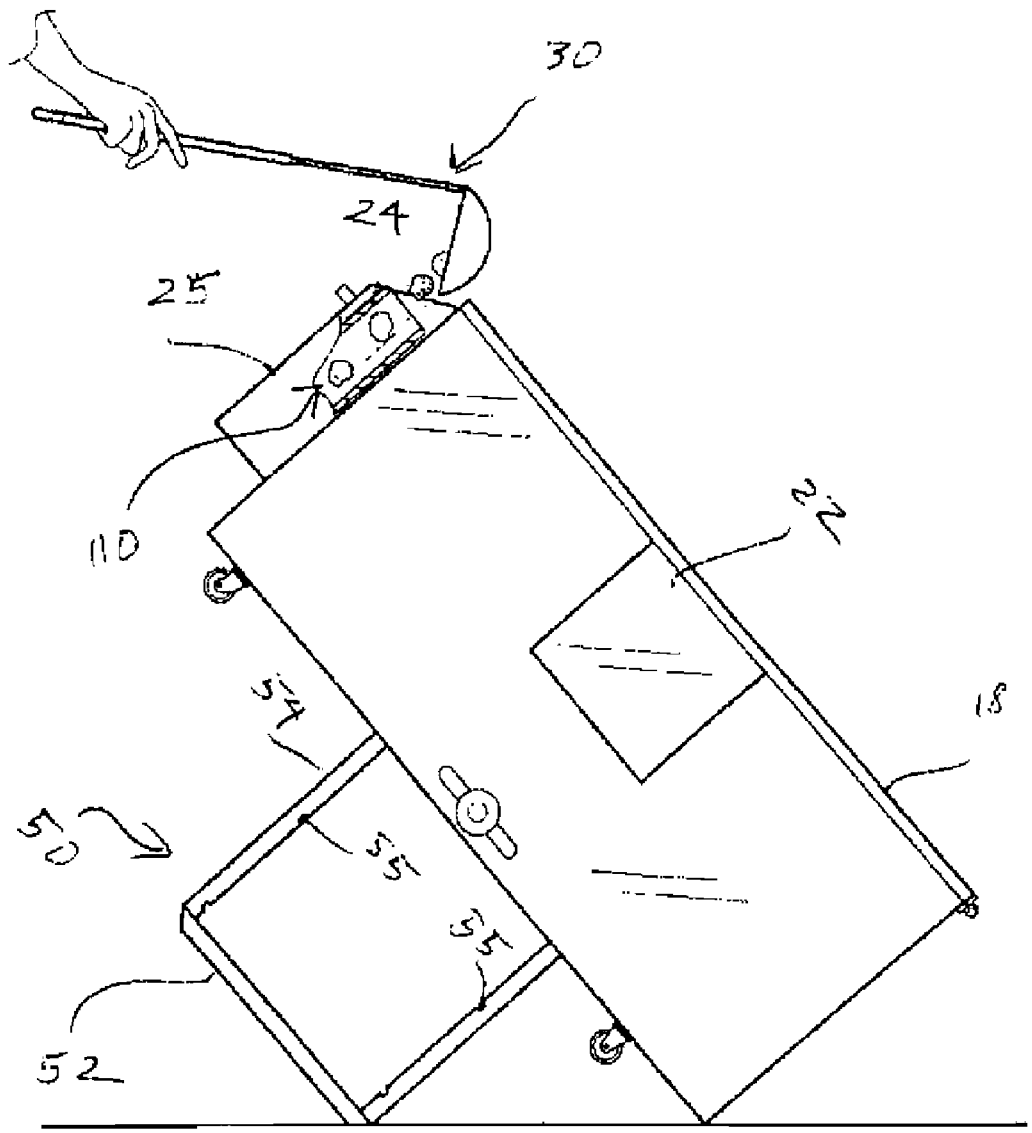
FIG. 5c is a side elevation view of the apparatus tilted on the support, second end down, with scoop removed and dropping excrement into the excrement tray.

Referring to FIGS. 5b and 5c, the apparatus 10 is tilted toward the second end 17. The scoop 30 is temporarily hooked on the interior hook 27 of the first end 16. The scoop 30 width is slightly less than the interior width of the box 12. The tilting the apparatus 10 toward the second end 17 thereby automatically screens the excrement 110 from the litter 100. The excrement 110 can therefrom be deposited within the excrement tray 24. The tray 24 is removable for ease in emptying. A return of the apparatus 10 to a level position, then shaking, returns litter 100 to an original, substantially level array.

Figure 6:
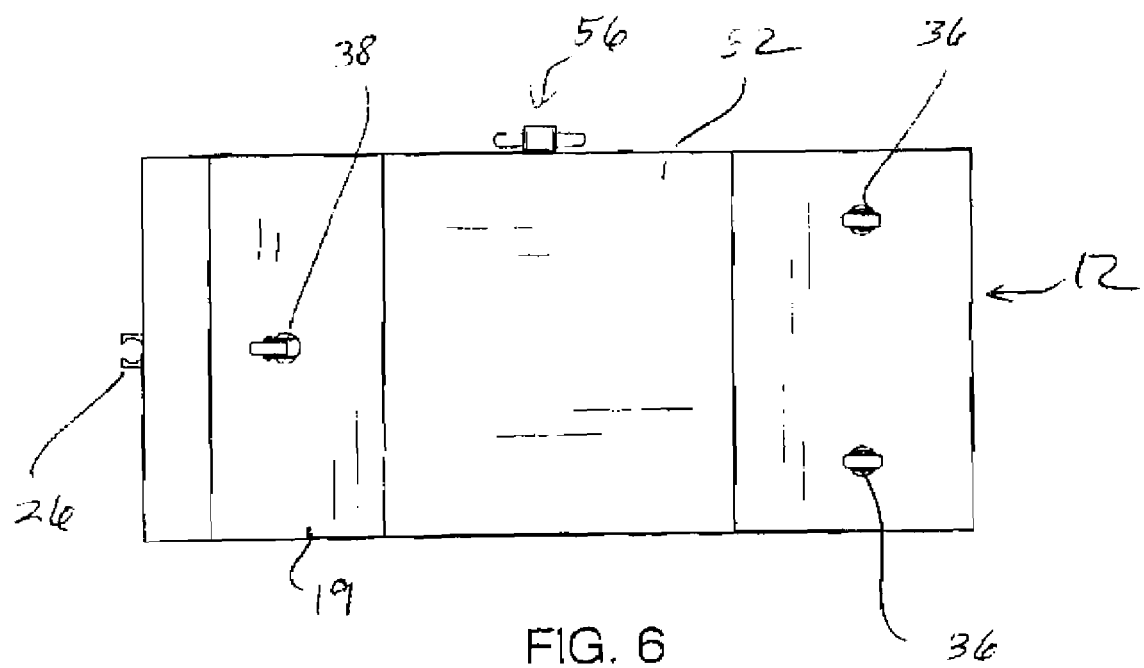
FIG. 6 is a bottom plan view of the apparatus.

Referring to FIG. 6, the bottom 19 of the wheels 36 are disposed proximal to the second end 17 of the box 12. The caster 38 is disposed proximal to the first end 16.

Figure 7:
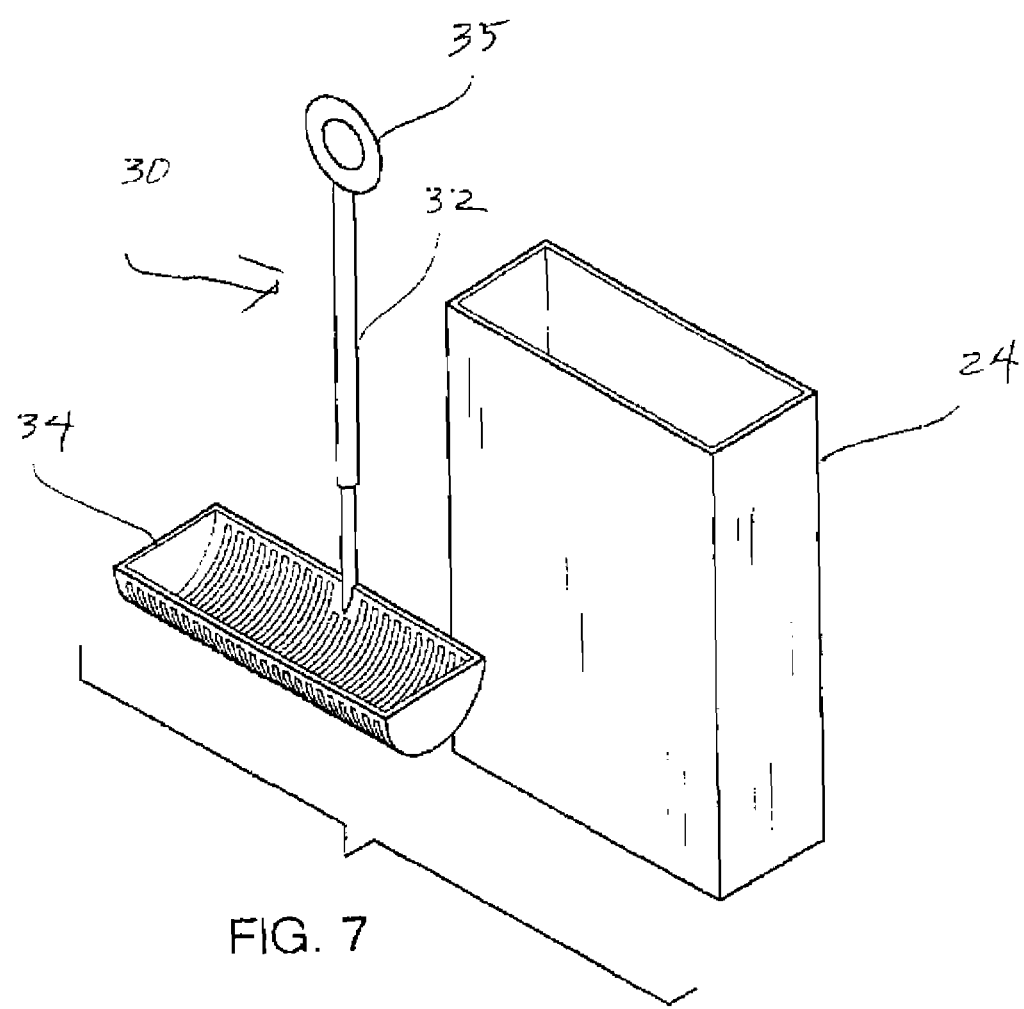
FIG. 7 is a perspective view of the scoop and the excrement tray.

Referring to FIG. 7, the removable excrement tray 24 and scoop 30 are illustrated. The scoop 30 is comprised of a scoop half-round 34. The half-round 34 is sieved. The telescoping handle 32 is topped with a handle ring 35 for convenience.

With respect to the above description then, it is to be realized that the optimum dimensional relationships for the parts of the cat litter box apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the cat litter box apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the cat litter box apparatus may be used.

Therefore, the foregoing is considered as illustrative only of the principles of the cat litter box apparatus. Further, since numerous modifications and changes will readily occur to those skilled in the art, it is not desired to limit the cat litter box apparatus to the exact construction and operation shown and described, and accordingly, all suitable modifications and equivalents may be resorted to, falling within the scope of the cat litter box apparatus.

What is claimed is:

1. A cat litter box apparatus, comprising:
a parallelepiped box having two opposed sides, a first end, a second end, and a bottom;
a transparent lid for the box;
a hinge for pivotally opening the lid;
a closeable entrance door on each side of the box;
a removable scoop, comprising:
  a sieved half-round, the half-round having a width slightly less than an interior width of the box;
  a handle extended from the half-round;
  a handle ring on an end of the handle opposite the half-round;
an interior hook within the first end of the box, the hook selectively receiving the handle ring of the scoop;
a tray keeper on an exterior of the first end of the box;
an excrement tray, the tray removably located within the tray keeper.

2. The apparatus in claim 1 wherein an interior hook is disposed within the second end of the box.

3. The apparatus in claim 1 wherein the scoop handle is telescopic.

4. The apparatus in claim 2 wherein the scoop handle is telescopic.

5. The apparatus in claim 1 wherein the box further comprises a means for temporarily securing a tilted position, the box tilted either toward or away from the first end.

6. The apparatus in claim 2 wherein the box further comprises a means for temporarily securing a tilted position, the box tilted either toward or away from the first end.

7. The apparatus in claim 3 wherein the box further comprises a means for temporarily securing a tilted position, the box tilted either toward or away from the first end.

8. The apparatus in claim 4 wherein the box further comprises a means for temporarily securing a tilted position, the box tilted either toward or away from the first end.

9. The apparatus in claim 5 wherein the box further comprises:
a pair of spaced apart wheels on the box bottom, the wheels disposed proximal to the second end of the bottom;
an omnidirectional caster on the box bottom, the caster proximal to the first end of the box.

10. The apparatus in claim 6 wherein the box further comprises:
a pair of spaced apart wheels on the box bottom, the wheels disposed proximal to the second end of the bottom;
an omnidirectional caster on the box bottom, the caster proximal to the first end of the box.

11. The apparatus in claim 7 wherein the box further comprises:
a pair of spaced apart wheels on the box bottom, the wheels disposed proximal to the second end of the bottom;
an omnidirectional caster on the box bottom, the caster proximal to the first end of the box.

12. The apparatus in claim 8 wherein the box further comprises:
a pair of spaced apart wheels on the box bottom, the wheels disposed proximal to the second end of the bottom;
an omnidirectional caster on the box bottom, the caster proximal to the first end of the box.

13. A cat litter box apparatus, comprising:
a parallelepiped box having two opposed sides, a first end, a second end, and a bottom;
a transparent lid for the box;
a hinge for pivotally opening the lid;
a closeable entrance door on each side of the box
a pair of spaced apart wheels on the box bottom, the wheels disposed proximal to the second end of the bottom;
an omnidirectional caster on the box bottom, the caster proximal to the first end of the box;
a removable scoop;
an interior hook within the first end of the box, the hook selectively receiving the handle ring of the scoop;
a tray keeper on an exterior of the first end of the box;
an excrement tray, the tray removably located within the tray keeper;
a compartment within each box side;
a box support, the support retractably extended below the box bottom;
a box support base;
two pairs of spaced apart support legs affixed to the support base, each pair of support legs affixed to an opposite side of the support base, each pair of support legs movably contained within one of the side compartments, the support base having a leading edge and a trailing edge;
an angled edge on the leading base edge and on the trailing base edge;
a plurality of spaced apart leg notches in each leg;
a support latch affixed to one side of the box, the latch comprising:
  a spring-loaded latch pivot;
  a support rod extended laterally from each side of the pivot, each support rod for retractable insertion into one of the leg notches;
a spaced apart pair of anchors within a top of each compartment;
a pair of spaced apart pulleys within a bottom of each compartment;
an elastic cord for each leg, each cord affixed to an anchor, each cord disposed partially around each pulley, each cord affixed to a top of a leg.

14. The apparatus in claim 13 wherein a counter is provided for each door.

15. The apparatus in claim 13 wherein an interior hook is provided within the second end of the box.

16. The apparatus in claim 14 wherein an interior hook is provided within the second end of the box.

17. The apparatus in claim 13 wherein the scoop comprises:
- a sieved half-round, the half-round having a width slightly less than an interior width of the box;
- a telescopic handle on the scoop extended from the half-round;
- a handle ring on an end of the handle opposite the half-round.

18. The apparatus in claim 14 wherein the scoop comprises:
- a sieved half-round, the half-round having a width slightly less than an interior width of the box;
- a telescopic handle on the scoop extended from the half-round;
- a handle ring on an end of the handle opposite the half-round.

19. The apparatus in claim 15 wherein the scoop comprises:
- a sieved half-round, the half-round having a width slightly less than an interior width of the box;
- a telescopic handle on the scoop extended from the half-round;
- a handle ring on an end of the handle opposite the half-round.

20. The apparatus in claim 16 wherein the scoop comprises:
- a sieved half-round, the half-round having a width slightly less than an interior width of the box;
- a telescopic handle on the scoop extended from the half-round;
- a handle ring on an end of the handle opposite the half-round.

* * * * *